No. 724,236. PATENTED MAR. 31, 1903.
E. P. ARMSTRONG.
SAW SWAGE.
APPLICATION FILED MAR. 15, 1902.
NO MODEL.
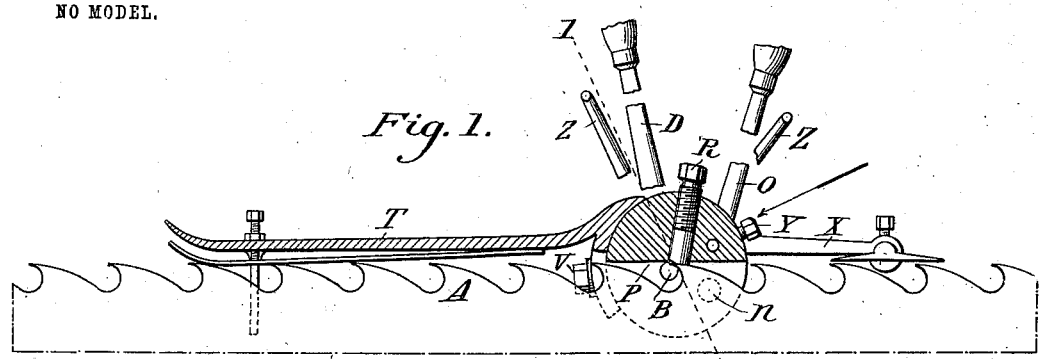
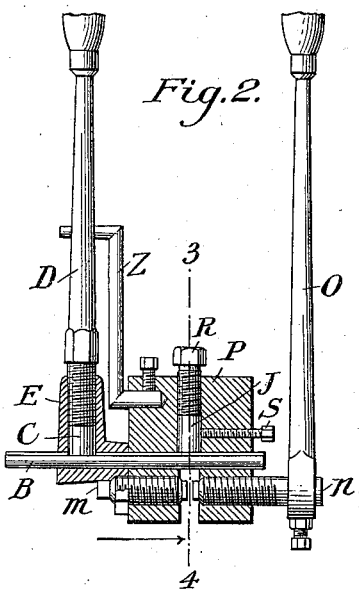
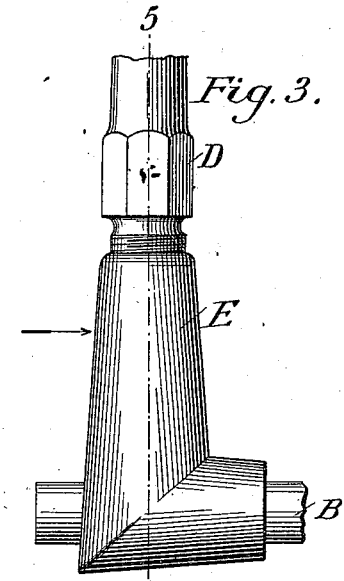
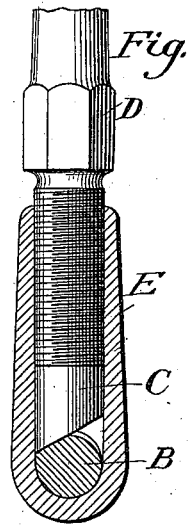
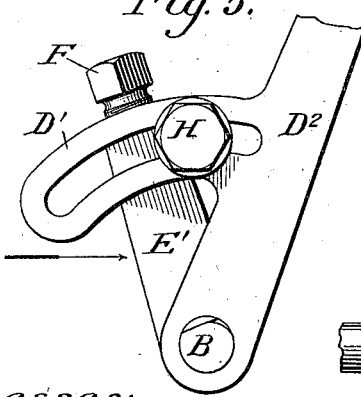
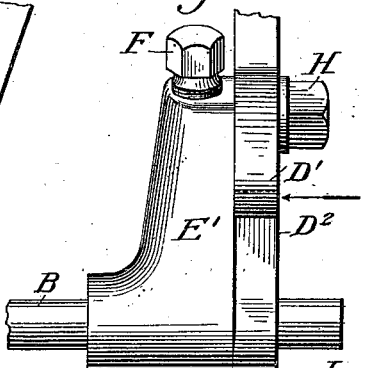
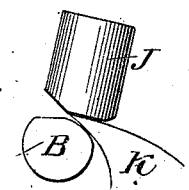
Witnesses:
Henry Waters
Charles Slater
Inventor:
Edward. P. Armstrong.

UNITED STATES PATENT OFFICE.

EDWARD P. ARMSTRONG, OF DEWDROP, PENNSYLVANIA.

SAW-SWAGE.

SPECIFICATION forming part of Letters Patent No. 724,236, dated March 31, 1903.

Application filed March 15, 1902. Serial No. 98,440. (No model.)

*To all whom it may concern:*

Be it known that I, EDWARD PICKERING ARMSTRONG, a subject of the King of Great Britain, residing at Dewdrop, in the county of Warren and State of Pennsylvania, have invented a new and useful Saw-Swage, of which the following is a specification.

My invention relates to improvements in saw-swages in which a fixed anvil is held against one side of the saw-tooth and a rotatory reciprocating eccentric swaging-die acts on the opposite side of the tooth, the movement of said eccentric die causing the space between it and said anvil to close up or open out, the anvil being placed on its side of the tooth and slipped back until the tooth rests against said die while standing at open, both said anvil and die being secured solid with the saw-tooth by setting up tight, clamping-screws on either side of said tooth thus securing the steel block or body of the whole swage, which carries said anvil, die, and clamping-screws, and by rotating said die part of a revolution it brings pressure to bear against said tooth while held between die and anvil as the space between them closes up, thus swaging said tooth out wider; and the object of my invention is, first, to provide a die whose shape is the same from one end to the other, having no notches or changes in the shape whatever during its whole length; second, to provide a strong, simple, and effective means to secure said die to the operating-handle in such a manner as to allow it (said die) to be moved endwise in the said handle easily and quickly to present a new wearing-surface to the tooth being swaged and enabling the die to be used a great part of its whole length as each spot in contact with the tooth becomes worn by moving it to a new spot, thus increasing the life of the die many times over those in use heretofore; third, to provide a die that can be refaced when worn at all the points within the limit of its end movement by taking it out of said handle and grinding it into shape again on the side of a common emery-wheel, thus forming a new die the whole length again and increasing its life still many more times over those in use heretofore; fourth, to provide a die which can be easily made from self-hardening steel, which does not permit of machine-work being done on it except by emery-wheel, or making said die from common tool-steel by milling into shape at one cut a long round bar and then cutting said bar into short lengths of dies and tempering; fifth, to provide a swage in which the anvil can be set to project into the working hole of the die and said die can still be slipped out or in to be cleaned or oiled without changing the adjustment of the anvil or removing it. I attain these objects by the mechanism illustrated in the accompanying drawings, in which similar letters refer to similar parts throughout the several views.

Figure 1 is a vertical section of the swage placed on the saw A. Fig. 2 is a section of the swage on line 1 2, Fig. 1, looking from the right, and dotted line 3 4 is where Fig. 1 is shown looking from the left. Fig. 3 is the dieholder and die. Fig. 4 is a section of Fig. 3 on line 5 6 looking from the left and shows die B clamped beneath the wedge C by the screw-pressure of handle D, threaded into holder E. Fig. 5 is die B, clamped in holder E' by set-screw F and handle $D^2$, loose on die B and secured to holder E' by set-screw H. Fig. 6 is the same looking from the left of Fig. 5, and Fig. 5 is Fig. 6 as seen from the right. Fig. 7 is die B and anvil J, showing their position ready to swage tooth K by rotating die B part of a revolution to the left, the whole swage carrying die B and anvil J and holding them in position by being secured to saw A by clamping-screws M and N, being forced together on either side of the saw by turning in screws N by clamping handle O.

The swage block or body P constitutes the frame or main body of the swage, the several parts being secured to it. Anvil J is adjusted up or down and held in place by screws R and S. (See Fig. 2.) Clamping-screws M and N are threaded into the block P. The guide T is secured to block P by screws V, and guide X is secured to block P by screws Y. Regulating-stops Z Z are secured to block P in the same manner as guide X and are adapted to be set at any point desired to regulate the throw of handle D to swage light or heavy. The die B may be operated and held in holder E either by handle D being fitted as a set-screw on its lower end and it either be screwed right down onto die B, holding the flattened side of die B at right angles to handle D by making the threaded part of handle D longer (see Fig. 4) or setting it onto the wedge C, made with tapering end so as to carry flat side of die B out of right angles with the handle D, right angles being right for use on gang-saws and the wedge position being right for band-saws, or it (die B) may be held in holder E' by the set-screw F, (see Figs. 5 and 6,) and handle D² being made with a slotted wing D', as shown in Fig. 5, said wing D' being clamped to holder E' by screw H, affording a means of setting handle D² at a great distance from a right angle to flat side of die B to adapt it to use on circular saws. The anvil J must be set to project below the top of or into the working hole of the die to some extent to get the adjustment necessary to make the swaging-cam act properly on the saw-teeth, the amount varying according to the shape of the swage-die and the condition of the saw-tooth to be swaged; but at all times it is sufficient to prevent the swage-die, as made heretofore in the shape of a cam formed in the center of a round shaft, leaving a shoulder at each end of said cam, said shoulder preventing the cam or die from sliding out from under it (the anvil J) on account of the shoulders at each end of the swage-die. To provide a swage-die without these shoulders is one of the objects of my new form of die B.

Fig. 3 is a detached view of die-holder and die. The die B is placed in the horizontal opening of holder E, (see Figs. 3 and 4,) and wedge C is then dropped in from the top of the vertical opening in holder E and slides down until it rests on the die B. Then the threaded or set-screw-formed handle D is screwed down into the vertical threaded opening in holder E until it strikes the top of the wedge C, and a common wrench is placed on the hexagon part of the handle D, and it is forced down onto the wedge C, and thus holds handle D, holder E, and die B all firmly together, and when it is desired to move the die B endwise a little to present a new portion thereof to the saw-tooth it is accomplished by simply slacking the handle D, and thus releasing the die B and then sliding it endwise to the place desired and again tilting the handle D.

In operating the swage the operator stands on the left-hand side of the swage as you look at it in Fig. 2, and the die-handle D is operated with the left hand, the working stroke being given by pushing it from him and the angle of the arm causes an end thrust from left to right on the die B, which is overcome by the hub of the die-holder E forming a collar on die B and engaging with the side of block P. The return stroke of the die-handle D having no work to do there is no perceptible tendency on that stroke to pull the die B out of its place from right to left. The result is that said die B stays in its place as determined by the collar formed by die-holder E. The collar thus formed is one of the essential features of the die-holder E.

The operation is as follows: When the device is in the position shown in Fig. 1, the saw-blade A extends into the recess in the lower side of block P, and the point of the tooth to be swaged is placed in position between anvil J and die B, and the block P is held in position relatively with the rake of the back or top of the saw-teeth by guide T resting on the teeth in advance of the swage-block P. The whole swage is then clamped securely to the saw by clamp-screws M and N. The swage-die B is now in such a position that its eccentric side comes in contact with the under side of the saw-tooth, while the anvil J is held against the top of the saw-tooth. The operator now takes hold of the handle D and gives it about one-eighth turn to the left. By the operator moving the handle D thus the die B is turned so that the eccentric side of the die B acts on the point of the saw-tooth and swages the same, the back of the tooth being pressed against the lower end of anvil J. As soon as this has been accomplished the operator returns the handle D to its former resting-place against the right-hand regulating-stop Z, then turns the handle O (see Fig. 2) so as to slacken the clamping-screw N, and thus liberate the swage from the saw, and the swage is shoved ahead or to the left the distance between two teeth, so that the next tooth ahead will pass into the space between the die B and anvil J, as before. The swage is then clamped by screw N and handle O, and the above-described operation is again repeated.

I am aware that prior to my invention saw-swaging devices have been made with rotatory reciprocating dies in conjunction with an anvil. I do not, therefore, claim such a combination broadly; but What I do claim as my invention, and desire to secure by Letters Patent, is—

In a device for swaging saw-teeth, the combination with the block or body, and the anvil and clamping-screws, of the swaging bar or die of uniform cross-section throughout its entire length, and a handle or holder secured thereto, comprising a block having openings therein at an angle to each other; one of said openings designed to receive the swaging bar or die, and a wedge piece and screw or handle in the other opening whereby the swaging bar or die may be adjusted longitudinally throughout its length to present different parts thereof to the saw-tooth substantially as shown and described.

In testimony whereof I have signed my name to this specification in the presence of two subscribing witnesses.

EDWARD P. ARMSTRONG.

Witnesses:
O. M. STEDWELL,
C. S. ENGLISH.